Patented Feb. 18, 1930

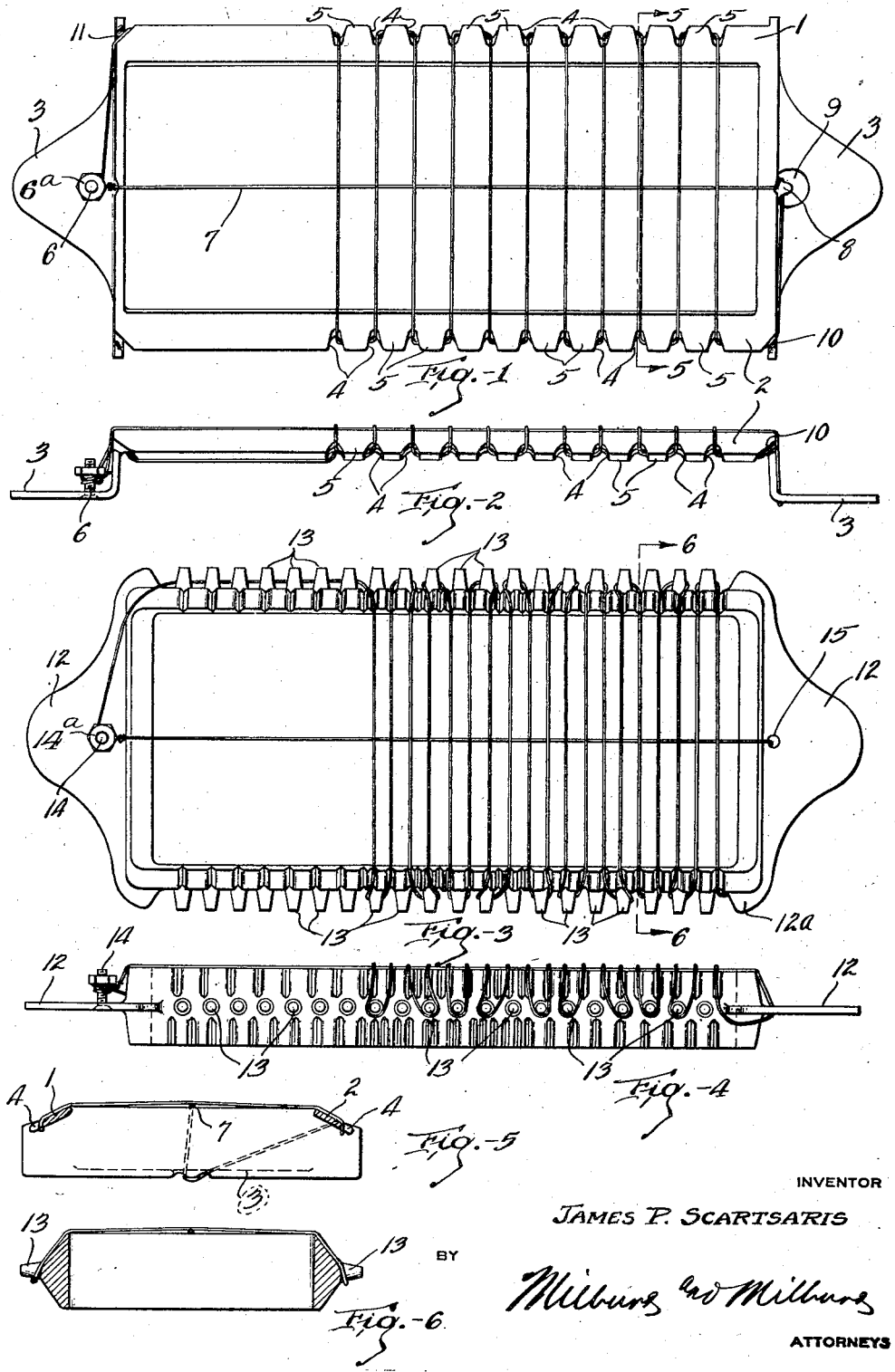

1,747,392

UNITED STATES PATENT OFFICE

JAMES P. SCARTSARIS, OF CLEVELAND, OHIO

BUTTER CUTTER

Application filed August 25, 1928. Serial No. 301,982.

This invention relates to an improved form of butter cutter.

The object of the present invention is to devise a comparatively compact form of butter cutter which at the same time is capable of various adjustments whereby different sizes of butter may be cut with the same device.

A further object is to provide such a device which may be constructed and sold at a comparatively small cost.

Other objects will appear from the following description and claims when considered together with the accompanying drawing.

Fig. 1 is a plan view of one form of device; Fig. 2 is a side elevation of the same form of device; Fig. 3 is a plan view of another form of device; Fig. 4 is a side elevation of the second form of device; Figs. 5 and 6 are transverse sectional views of Figs. 1 and 3, taken upon lines 5—5 and 6—6, respectively.

In the form of device shown in Figs. 1 and 2, the substantially rectangular frame may be formed as a metal casting or as a metal stamping. In either case, the frame comprises the longitudinal side members 1 and 2, and the end members which are provided with the handle portions 3. The side members are inclined somewhat downwardly and have notches cut therein at regular desired intervals, as indicated by reference numeral 4, so as to form ears 5 at opposite points along the two side members of the frame. These slots and ears are for the purpose of maintaining the stretched wire in position upon the frame, as clearly indicated in the drawing. The one handle member 3 is provided with a screw 6 extending through the same, to which there is secured the two ends of a single flexible wire which is arranged upon the frame member in taut condition so as to serve as a cutting means for the butter. In applying the wire to the frame, the one end thereof is secured to the screw 6 and is stretched longitudinally along the middle portion of the frame, as indicated by reference numeral 7, and is then extended about the integrally formed ear 8 in the opening 9 in the handle portion 3. Upon extending the wire about the ear 8, it is extended across the one-half portion of the end of the frame and passed through a suitably formed cut or groove 10 at the corner of the frame whence the wire is led in under the first ear 5 and then extended back and forth across the frame, through the slits and about the ears 5. It is to be understood that the slits 4 and ears 5 may be formed throughout any desired portion of the frame and that they may be arranged in such a manner as to provide any desired space between the wires for cutting a desired size of butter. In the present case, the transverse stretches of the wire are discontinued at such a point as to leave open space on the two sides of the longitudinal wire 7 of an extent corresponding to the halves of a pound block of butter. In the present case, the wire, upon reaching the last slit 4, is led along under the remaining portion of the side of the frame and extended through the groove 11 and across the half of the end portion of the frame so as to then be secured about the screw 6. Then, upon turning the screw 6, the wire may be drawn taut and maintained in such condition.

In using the above described form of butter cutter, the pound block of butter may be cut into halves by means of the longitudinal wire 7 and in the manner just now referred to. That is, the block of butter may be cut longitudinally into half-pound portions. Then, each half-pound portion may be cut by means of the transverse and longitudinal wires so as to obtain the smaller pieces of butter, as may be desired. Should it be desired to cut the half-pound portions into pieces twice the size of that provided for in the present illustration, the transverse strands of wire may be spaced apart twice the distance herein shown. That is, the wire may be stretched back and forth and engaged through the alternating slits and about the alternating ears.

The form of device illustrated in Figs. 3 and 4 also comprises an integral one-piece casting of rectangular form having integrally formed handle portions 12 at the two ends thereof. The side walls of this form of device are provided with integrally formed ears 13 which are arranged substantially midway of the height of the side portions of the frame as clearly indicated in Fig. 4. These ears are arranged equal distances apart and the sides of the frame are inclined or beveled inwardly both above and below the ears 13. These beveled side portions are provided with slits through which to extend the stretches of wire which are extended about the ears 13. In this case, as in the preceding form of device, there is employed a single wire, both ends of which are secured to the screw 14 mounted in the one handle portion 12. The wire in this case is applied in the same general manner as in the preceding form of device. That is, the one end of the wire is first anchored to the screw 14 and is then stretched substantially midway along the length of the frame, thence through the opening 15 in the other handle portion 12 under which the wire then passes to the side of the frame and under the corner portion 12ª. The wire is then extended through the slits and about the ears 13 so as to extend back and forth across the frame in parallel stretches for the same purpose as already described in connection with the preceding form of device. As before explained, the transverse parallel stretches of wire may extend throughout any desired portion of the frame, although it is preferred to reserve a portion at the one end thereof which has only the longitudinally extending wire which is adapted for severing the pound block of butter into half-pound blocks. In this case, as in the preceding form of device, the half-pound portions are then each cut into smaller pieces by means of the intersecting transverse and longitudinal stretches of wire.

The present form of device, furthermore, is capable of cutting the half-pound portions of butter into various sizes of smaller pieces, according to the size desired. For instance, along the upper beveled portions of the sides of the frame, there may be provided two series of slits spaced at two different distances apart. That is, at the right hand end portions of the upper beveled portions, the slits may be spaced apart at suitable distances corresponding to eighty individual cuts per pound; whereas the upper beveled portion at the left hand end of the frame may be provided with slits separated a distance corresponding to seventy-two individual cuts per pound. Throughout the middle part of the upper beveled portion, these two series of slits may overlap for the purpose of economizing space so as to keep the proportions of the device within certain limits.

Then the lower beveled portions along the sides of the frame may be provided with slits at the right hand end spaced apart at suitable intervals for the cutting of a pound block into sixty-four individual pieces; while the left hand portions of the lower beveled side portions may be slitted at suitable distances corresponding to fifty-six individual pieces. Here also the right and left hand series of slits overlap throughout the middle portion for the purpose of economizing space.

Assuming the length of the half-pound block of butter to be substantially four and one-half inches, the distance between the slits may be determined according to the number of individual pieces desired. Thus, the number of transverse stretches of wire can also be readily determined. Supposing the slits along the upper right hand end portion of the side of the frame to be spaced for the cutting of eighty individual pieces, then by arranging the wire in the alternating slits, rather than in all of the slits, the number of individual cuts of butter can be reduced to forty. The same principle holds true throughout all of the several series of slits, it being remembered that in calculating the number of pieces to be cut and the corresponding spacing of the slits, they should always be a multiple of four. This is true since the pound block is first cut into halves and the halves are then cut into quarters by the same longitudinally extending wire.

In both forms of device, as herein disclosed, the user can determine the exact size of individual pieces of butter desired for use at a given time, and can then regulate or adjust the stretches of wire across the frame accordingly. That is, the wire may be loosened by proper adjustment of the screw to which the ends of the wire are secured, and after setting the transverse stretches of wire according to the immediate need, the wire can be drawn taut by simply turning the screw. If so desired, the nuts 6ª and 14ª may be employed as a means of securing the wires more firmly in adjusted position. Thus the applicant has not only devised a simple and compact form of device but one in which various adjustments are possible for the purpose of cutting various sizes of individual pieces of butter. Furthermore, there is employed but a single wire, both ends of which may be drawn taut at the same time by the manipulation of a single screw.

It is to be understood that the present disclosure is merely for purposes of illustration and that this same principle of invention may be embodied in various modified forms of structure. All such modifications and variations are intended to be comprehended by the following claims.

What I claim is:

1. A butter cutter comprising a one-piece frame, projections arranged along opposite sides of said frame, a single wire extending back and forth across said frame and about said projections, and a single means upon one end of said frame for engaging the two ends of said wire for securing the same in taut condition.

2. A butter cutter comprising a one-piece frame, projections arranged along opposite sides of said frame, a single wire extending back and forth across said frame and about said projections, a plurality of series of slits provided upon opposite sides of said frame and adjacent said projections, the slits of one series being spaced apart a different distance from those of another series, and a single means upon one end of said frame for engaging the two ends of said wire for securing the same in taut condition about said projections and in said slits, whereby said wire can be arranged with its transverse portions spaced different distances apart, according to the size of butter cut desired.

3. A butter cutter comprising a one-piece frame, projections arranged along opposite sides of said frame, a single wire extending back and forth across said frame and about said projections, a plurality of series of slits provided upon the upper and lower portions of the sides of said frame and adjacent said projections, the slits of one series being spaced apart a distance different from that between the slits of another of said series, and a single means upon said frame for engaging the two ends of said wire and for securing the same in taut condition about said projections and in said slits, whereby said wire can be arranged with its transverse portions spaced at different distances apart, according to the size of butter cut desired.

4. A butter cutter comprising a one-piece frame, projections arranged along opposite sides of said frame, a single wire extending back and forth across said frame and about said projections, a plurality of series of slits provided upon opposite end portions of the sides of said frame and adjacent said projections, the slits of one series being spaced apart a distance different from that between the slits of another of said series, and a single means upon said frame for engaging the two ends of said wire for securing the same in taut condition about said projections and in said slits, whereby said wire can be arranged with its transverse portions spaced at different distances apart according to the size of butter cut desired.

5. A butter cutter comprising a one-piece frame, projections arranged along opposite sides of said frame, a single wire extending back and forth across said frame and about said projections, a plurality of series of slits provided upon opposite end portions of the sides of said frame and adjacent said projections, the slits of one series being spaced apart a distance different from that between the slits of another of said series, and a single means upon said frame for engaging the two ends of said wire for securing the ends of said wire for securing the same in taut condition about said projections and in said slit, the slits of said series being arranged in overlapping relation throughout the middle portion of each of the sides of said frame, whereby said wire can be arranged with its transverse portions spaced at different distances apart according to the size of butter cut desired.

6. A butter cutter comprising a substantially rectangular frame having opposite upper and lower side portions of two of the sides thereof beveled inwardly from substantially the middle point of the height thereof, projections arranged along the sides of the frame and substantially mid-way of said upper and lower beveled portions, a plurality of series of slits provided upon said beveled portions and adjacent said projections, the slits of one series being spaced a different distance apart than those of another series, a wire for cutting the butter, and means upon said frame for securing the wire in taut condition about the said projections and in said slits, whereby said wire can be arranged with its transverse portions spaced different distances apart according to the size of butter cut desired.

7. A butter cutter comprising a substantially rectangular frame of one piece having integral handle portions at the ends thereof, the opposite sides of said frame having oppositely disposed integrally formed projections along the sides thereof and substantially mid-way of the height thereof, said sides being beveled inwardly above and below said projections, a plurality of series of slits provided upon each of said beveled portions and overlapping each other throughout the middle portions of the sides of the frame, the slits of one series being spaced apart a different distance from those of another series, a single wire for cutting the butter, said slits being adjacent said projections for co-operation therewith in maintaining the wire in stretched arrangement back and forth across said frame, and an adjustable single means for maintaining the said single wire in taut condition about said projections and in said slits, said wire extending longitudinally substantially mid-way of the width thereof, said parts being so constructed and arranged that said wire can be secured with its transverse portions spaced at different distances apart according to the size of butter cut desired.

8. A butter cutter comprising a substantially rectangular frame of one piece having integrally formed handle portions at the ends thereof, the opposite sides of said frame having oppositely disposed and integrally formed projections along the sides thereof and substantially mid-way of the height thereof, said sides being beveled inwardly above and below said projections, a plurality of series of slits provided upon each of said beveled portions and overlapping each other throughout the middle portions of the sides of the frame, the slits of one series being spaced a different distance apart from those of another series, a single wire for cutting the butter, said slits being adjacent said projections for co-operation therewith in maintaining the wire in stretched arrangement back and forth across the frame, and an adjustable single means for maintaining said wire in taut condition about said projections and in said slits, said wire extending longitudinally substantially mid-way of the width thereof, said transverse stretches of wire extending throughout only a portion of the length of said frame, and said longitudinal portion of said wire extending throughout the entire length thereof, thereby providing a means for first cutting a block of butter in one direction and through the middle thereof so as to form halves, and then cutting each half at right angles to the first direction of cutting and at the same time still further sub-dividing the same into individual cuts, said parts being so constructed and arranged that said wire can be arranged with its transverse portions spaced at different distances apart, according to the size of butter cut desired.

In testimony whereof, I hereby affix my signature.

JAMES P. SCARTSARIS.